(12) United States Patent
Tsukada

(10) Patent No.: US 12,192,418 B2
(45) Date of Patent: Jan. 7, 2025

(54) CONTROL APPARATUS IN WHICH TABBED MENU SCREENS ARE INITIALIZED AND/OR LOCKED, AND METHOD AND STORAGE MEDIUM FOR SUCH CONTROL APPARATUS

(71) Applicant: CANON KABUSHIKI KAISHA, Tokyo (JP)

(72) Inventor: Nobuyuki Tsukada, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/490,492

(22) Filed: Oct. 19, 2023

(65) Prior Publication Data

US 2024/0146852 A1    May 2, 2024

(30) Foreign Application Priority Data

Oct. 26, 2022    (JP) .................. 2022-171627

(51) Int. Cl.
*H04N 1/00* (2006.01)
(52) U.S. Cl.
CPC ..... *H04N 1/00432* (2013.01); *H04N 1/00474* (2013.01)
(58) Field of Classification Search
None
See application file for complete search history.

(56) References Cited

U.S. PATENT DOCUMENTS

| | | | |
|---|---|---|---|
| 9,798,869 B2 | 10/2017 | Suzuki | G06F 21/31 |
| 10,182,169 B2 | 1/2019 | Tokiwa et al. | H04N 1/32 |
| 10,496,240 B2 | 12/2019 | Kasamatsu | G06F 3/04817 |
| 10,742,824 B2 | 8/2020 | Liu | H04N 1/00432 |
| 10,747,431 B2 | 8/2020 | Ryu et al. | G06F 3/0488 |
| 10,855,780 B2 | 12/2020 | Katano et al. | G06F 15/16 |
| 11,082,572 B2 | 8/2021 | Ogura | H04N 1/00514 |
| 11,416,182 B2 | 8/2022 | Shirai et al. | G06F 3/12 |
| 2009/0092106 A1 | 4/2009 | Nakayama | 370/338 |
| 2012/0266236 A1 | 10/2012 | Miwa et al. | G06F 21/00 |
| 2013/0014017 A1* | 1/2013 | Sato | H04N 1/00464 715/733 |

(Continued)

FOREIGN PATENT DOCUMENTS

| | | |
|---|---|---|
| JP | 2006-191328 | 7/2006 |
| JP | 2007-060033 | 3/2007 |

(Continued)

OTHER PUBLICATIONS

U.S. Appl. No. 18/362,002, filed Jul. 31, 2023.

(Continued)

*Primary Examiner* — Andrew H Lam
(74) *Attorney, Agent, or Firm* — Venable LLP

(57) ABSTRACT

A control apparatus includes: a display control unit that performs control to display any one of multiple menu screens on which multiple menu items are arranged, respectively; a reception unit that receives an instruction to initialize the menu screen designated out of the multiple menu screens; and a control unit that performs control to initialize relevant information, which is information individually held correspondingly to the designated menu screen and includes cookie information used by a Web browser, based on the reception of the instruction of the initialization.

17 Claims, 13 Drawing Sheets

(56) References Cited

U.S. PATENT DOCUMENTS

| | | | |
|---|---|---|---|
| 2013/0021277 A1 | 1/2013 | Kasamatsu | G06F 3/041 |
| 2016/0277273 A1* | 9/2016 | Arai | H04L 43/0876 |
| 2017/0085731 A1 | 3/2017 | Akuzawa | H04N 1/00 |
| 2019/0250810 A1 | 8/2019 | Yamauchi et al. | G06F 3/0488 |
| 2019/0306346 A1 | 10/2019 | Nakamura et al. | H04N 1/00 |
| 2020/0106898 A1* | 4/2020 | Liu | H04N 1/00506 |
| 2020/0162628 A1 | 5/2020 | Horiike et al. | H04N 1/00477 |
| 2020/0228672 A1 | 7/2020 | Baliguat et al. | H04N 1/00572 |
| 2022/0166890 A1* | 5/2022 | Okuno | H04N 1/00315 |

FOREIGN PATENT DOCUMENTS

| | | |
|---|---|---|
| JP | 2012-093612 | 5/2012 |
| JP | 2013-025561 | 2/2013 |
| JP | 2017-059050 | 3/2017 |
| JP | 2017-211729 | 11/2017 |
| JP | 2018-126979 | 8/2018 |
| JP | 2020-052972 | 4/2020 |
| JP | 2020-052973 | 4/2020 |
| JP | 2020-088412 | 6/2020 |
| JP | 2020-112652 | 7/2020 |
| JP | 2020-137045 | 8/2020 |

OTHER PUBLICATIONS

U.S. Appl. No. 18/365,541, filed Aug. 4, 2023.
U.S. Appl. No. 18/230,241, filed Aug. 4, 2023.
U.S. Appl. No. 18/490,461, filed Oct. 19, 2023.
U.S. Appl. No. 18/490,479, filed Oct. 19, 2023.
U.S. Appl. No. 18/490,509, filed Oct. 19, 2023.
Office Action dated Feb. 13, 2024 in Japanese Application No. 2022-171546.
Office Action dated Apr. 23, 2024 in Japanese Application No. 2022-171546, together with English translation thereof.
Notice of Allowance dated Aug. 8, 2024 in U.S. Appl. No. 18/490,479.
Office Action dated Aug. 13, 2024 in Japanese Application No. 2024-071464, together with English translation thereof.
Epson LP-S8180 Series User Guide, 2020, pp. 11 and 23 [available at <https://www2.epson.jp/support/manual/NPD647103_UG_JA.PPDF>], with English translation of pp. 11 and 23.
Office Action dated Nov. 19, 2024 in Japanese Application No. 2024-071464, together with English translation thereof.

\* cited by examiner

CONTROL APPARATUS IN WHICH TABBED MENU SCREENS ARE INITIALIZED AND/OR LOCKED, AND METHOD AND STORAGE MEDIUM FOR SUCH CONTROL APPARATUS

BACKGROUND

Field

The present disclosure relates to a technique of controlling a display screen.

Description of the Related Art

Japanese Patent Laid-Open No. 2020-52972 discloses a multi function peripheral that displays a shortcut list screen in the form of tabs. In a general mode in which a registered user does not log in, the above-described multi function peripheral displays a common tab, and in a personal mode in which the registered user logs in, the above-described multi function peripheral displays the common tab and a personal tab corresponding to the user logging in. Additionally, the personal tab is managed so as to be able to be opened by password authentication or authentication using a card.

SUMMARY

However, for example, in a case where the user performs an operation to go back and forth between multiple tabs, there may occur a case in which authentication is conducted again on a tab on which authentication is succeeded once; therefore, there is a possibility of a deterioration in the operability. Additionally, there is presented no optimal method of initializing information held in each tab.

A control apparatus according to an aspect of the present disclosure includes at least one memory and at least one processor and/or at least one circuit which function as: a display control unit that performs control to display any one of multiple menu screens on which multiple menu items are arranged, respectively; a reception unit that receives an instruction to initialize the menu screen designated out of the multiple menu screens; and a control unit that performs control to initialize relevant information, which is information individually held correspondingly to the designated menu screen and includes cookie information used by a Web browser, based on the reception of the instruction of the initialization.

Further features of the present invention will become apparent from the following description of exemplary embodiments with reference to the attached drawings.

BRIEF DESCRIPTION OF THE DRAWINGS

FIG. 13 is a flowchart illustrating a sequence in a case of being powered on.

DESCRIPTION OF THE EMBODIMENTS

Figure 1:
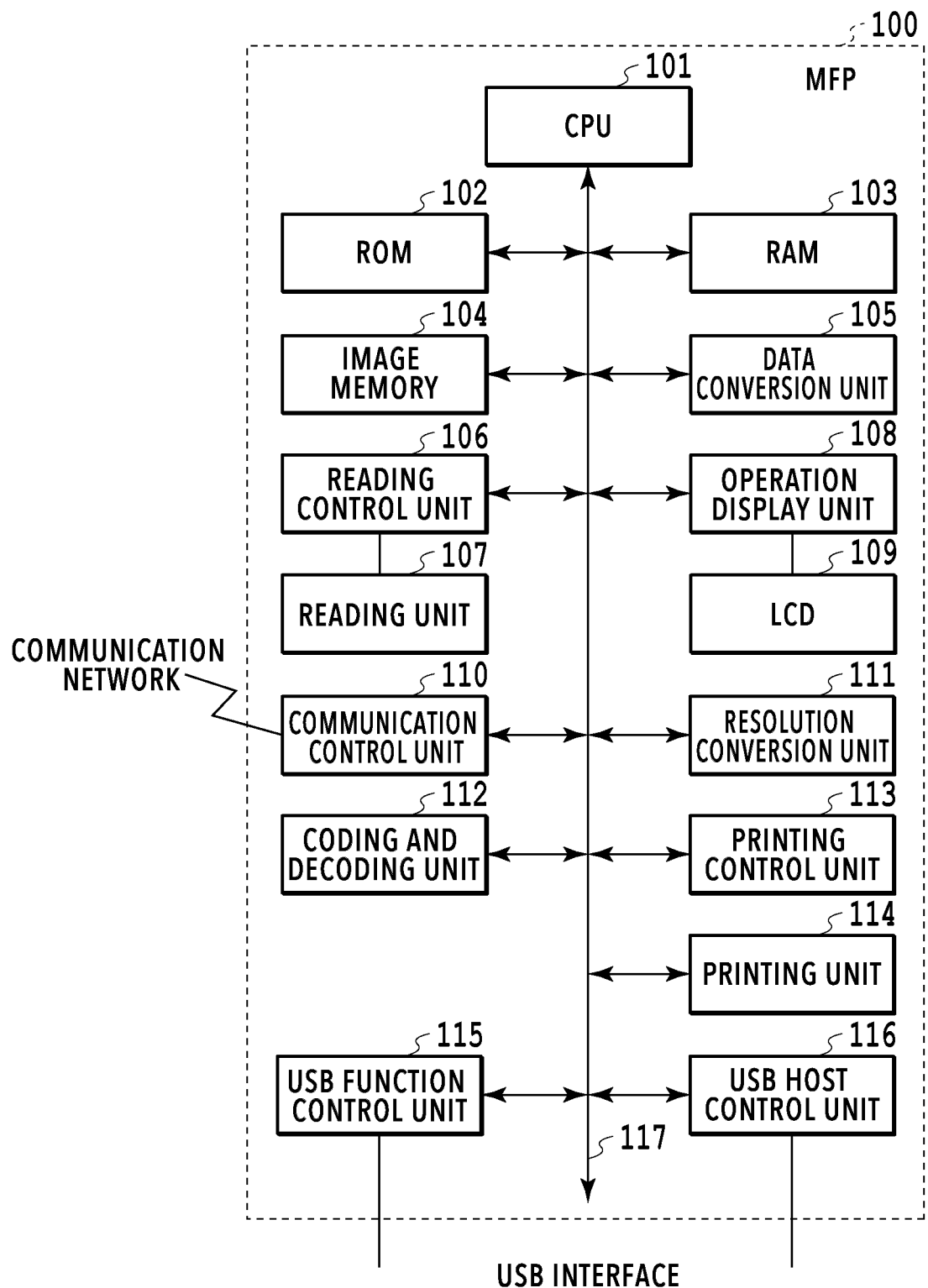
FIG. 1 is a block diagram of an MFP.

Embodiments of the present disclosure are described below with reference to the drawings. Note that, the following embodiments are not intended to limit the present disclosure, and additionally, not all the combinations of the characteristics described in the present embodiments are necessarily required for the means for solving the problems of the present disclosure. Note that, the same reference numerals are given to describe the same configurations.

Embodiment 1

<Block Diagram>

FIG. 1 is a block diagram illustrating a schematic configuration example of an MFP 100 in the present embodiment. The MFP 100 is a type of an information processing apparatus. Additionally, the MFP 100 is a type of an electronic apparatus. The MFP 100 of the present embodiment has an information processing function such as generating, storing, and transmitting device information including log information and status information. Additionally, the MFP 100 has an image formation function to form an image on a printing medium by using a printing control unit 113 and a printing unit 114 described later.

The MFP 100 includes a CPU 101, a ROM 102, a RAM 103, an image memory 104, a data conversion unit 105, a reading control unit 106, a reading unit 107, an operation display unit 108, an LCD 109, a communication control unit 110, and a resolution conversion unit 111. In addition, the MFP 100 includes a coding and decoding unit 112, the printing control unit 113, the printing unit 114, a USB function control unit 115, a USB host control unit 116, a bus 117, and a non-volatile memory 118.

The CPU 101 is a system control unit and controls overall the MFP 100. The ROM 102 is a non-volatile memory that stores fixed data such as a control program to be executed by the CPU 101, a data table, and an embedded operating system (OS). In the present embodiment, each control program is stored in the ROM 102, and software execution control such as scheduling, task switching, or interruption processing is performed under the management by the embedded OS stored in the ROM 102. The ROM 102 stores information indicating a permission state, which indicates whether to provide device information to the outside. The RAM 103 is formed of a static random access memory (SRAM) or the like that requires a backup power supply, and feeding to the RAM 103 is guaranteed by a not-illustrated primary battery for data backup. The RAM 103 stores a program control variable and the like. The image memory 104 is formed of a dynamic random access memory (DRAM) or the like and can accumulate image data. Additionally, a part of the area in the image memory 104 is secured as a work area to execute software processing. The data conversion unit 105 can perform conversion of the image data such as page description language (PDL) analysis and computer graphics (CG) rasterization of character data.

The reading unit 107 optically reads an original document by a CIS image sensor and converts it into an electric image signal. The reading control unit 106 performs various types of image processing such as binarization processing and halftone processing to this image signal and outputs high-definition image data. Note that, a method of optically reading the original document may be either of: a sheet reading control method in which the original document is read by a fixed CIS image sensor; and a book reading control method in which the original document fixed on a platen glass is read by a moving CIS image sensor.

The operation display unit 108 includes a minimal key such as a numerical value input key, a mode setting key, a determination key, and a cancel key and a light-emitting diode (LED), a seven-segment display unit, or the like. The above-described various keys are implemented by so-called software keys displayed on the LCD 109 and can receive an operation from the user. In a case where an operation by the user is not performed for a certain period of time, the LCD 109 switches off a backlight of the LCD 109 to reduce the power consumption.

The communication control unit 110 controls communication between the MFP 100 and a communication network 300 and establishes connection to an Internet service provider and communication of various data with a service management server 200. Additionally, the communication control unit 110 can determine whether the MFP 100 is connected to the Internet or is connected to only a LAN. Note that, the connection between the communication control unit 110 and the communication network 300 is established by a publicly known method such as HTTP and XMPP. The resolution conversion unit 111 performs resolution conversion processing such as mutual conversion between image data in millimeters and image data in inches. Note that, the resolution conversion unit 111 also can execute enlarging and reducing processing on the image data.

The coding and decoding unit 112 performs coding and decoding processing or performs enlarging and reducing processing on the image data (uncompressed, MH, MR, MMR, JBIG, JPEG, and so on) handled by the MFP 100. The printing control unit 113 performs various types of image processing such as smoothing processing, printing density correction processing, and color correction on the image data to be printed to convert it into high-definition image data and then outputs it to the printing unit 114. Additionally, the printing control unit 113 also plays a role to regularly obtain state information data of the printing unit 114. The printing unit 114 is formed of a laser beam printer, an ink-jet printer, or the like and prints the image data generated by the printing control unit 113 on the printing medium such as a sheet.

The USB function control unit 115 performs protocol control according to the USB communication standard. The USB host control unit 116 is a control unit to establish communication based on the protocol determined by the USB communication standard. This USB communication standard is a standard for bidirectional high-speed data communication. This USB communication standard defines that multiple hubs or functions (slaves) are connectable to a single host (master). That is, the USB host control unit 116 provides a function as a host in the USB communication. The constituents other than the reading unit 107 and the LCD 109 are connected to each other through the bus 117.

<Operation Display Unit>

The operation display unit 108 according to the present embodiment includes a screen in the form of tabs.

Figure 2:
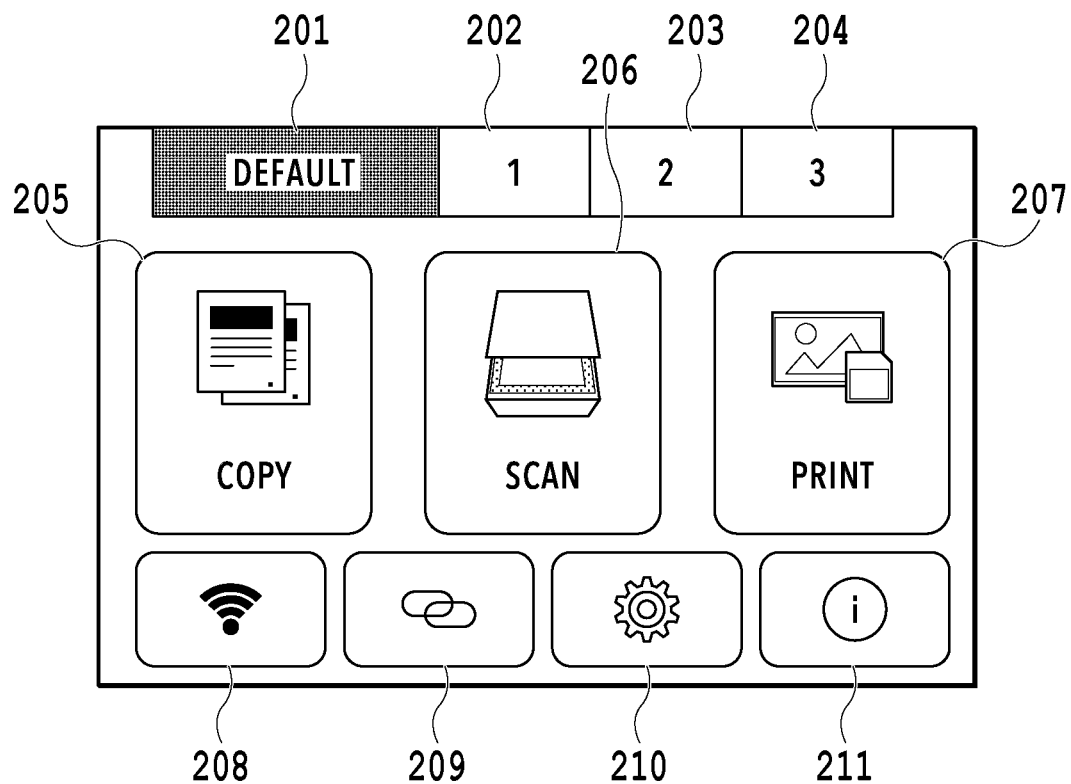
FIG. 2 is a diagram illustrating a default home screen displayed on an operation display unit.

FIG. 2 is a diagram illustrating a default home screen displayed on the operation display unit 108. A tab 201 is a tab corresponding to the default home screen. Tabs 202, 203, and 204 are tabs each corresponding to a custom home screen. The user can switch a menu screen between a default home and a custom home by pressing the tab. Additionally, the different tab color of the tab 201 from the color of the other tabs indicates that the screen of the tab 201 (that is, the default home screen) is currently displayed. The default home screen includes a copy menu button 205, a scan menu button 206, a print menu button 207, a LAN button 208, a wireless connection button 209, a setting button 210, and a hint button 211. A transition to a screen corresponding to each button is made with the user pressing each button. Specifically, for example, in a case where the copy menu button 205 is pressed, an area into which the setting for copying is inputted or a screen to instruct the execution of copying is display-controlled. On the default home screen, unlike the custom home screen described later, a button that is determined in advance is displayed without the arbitrary selection by the user. However, it is not limited to this mode, and a mode in which the user can arbitrarily select or change the button to be displayed on the default home screen may be applicable.

Figure 3:
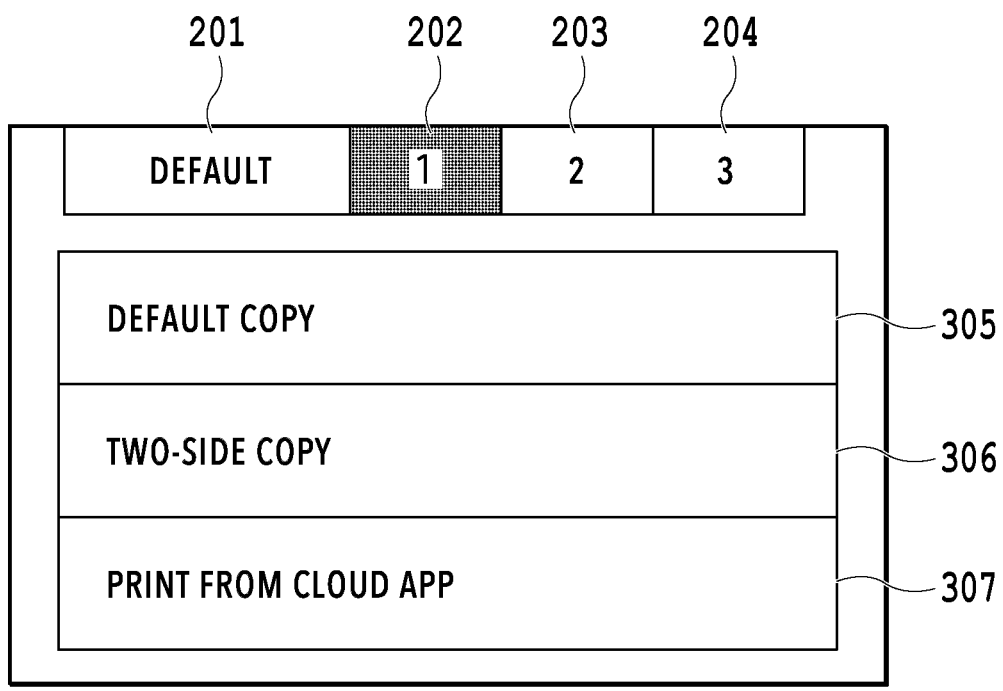
FIG. 3 is a diagram illustrating a custom home screen displayed on the operation display unit.

FIG. 3 is a diagram illustrating the custom home screen of the tab 202 displayed on the operation display unit 108. The different tab color of the tab 202 from the color of the other tabs indicates that the custom home screen of the tab 202 is currently displayed. The custom home screen of the tab 202 includes custom menus 305, 306, and 307. Each menu is a menu that can be customized by the user, and it is possible to designate a function to be displayed in each menu position. In FIG. 3, "default copy" is set as the custom menu 305, "two-side copy" is set as the custom menu 306, and "print from cloud app" is set as the custom menu 307, respectively. Note that, unlike the default home screen, it is possible to register a menu associated with setting of processing executed from each menu on the custom home screen. That is, for example, in a case of the copying executed from the copy menu button 205, it is necessary to set additionally whether the copying is two-side copy or one-side copy after the copy menu button 205 is pressed. However, in a case of the copying executed from the custom menu 306, it is unnecessary to set additionally whether the copying is two-side copy or one-side copy after the custom menu 306 is pressed.

Additionally, "print from cloud app" denoted by 307 indicates a button to execute a Web application using a Web browser. In a case where "print from cloud app" is selected, the CPU 101 deploys a program code of the Web browser stored in the ROM 102 to the RAM 103 to execute. Then, the Web application is executed by establishing communication with an external server (not illustrated) through the communication control unit 110.

In the present embodiment, a function to hold cookie information used by the above-described Web application in the non-volatile memory 118 individually for each home screen is provided. Thus, it is possible to properly use login information and the like to a server depending on the scenes (tabs), and it is possible to improve the operability of the Web application.

Moreover, it is possible to set a lock to each custom home screen. In the present embodiment, the lock means control to prevent displaying of the custom home screen in a case where there is no input of a correct password into a password input screen. In a case of the custom home screen to which no lock is set, once the tab corresponding to the custom home screen is operated, the custom home screen is displayed without displaying the password input screen. The setting of the custom menu and the setting of the lock of the custom home screen can be performed from the setting button 210 in FIG. 2.

Figure 4:
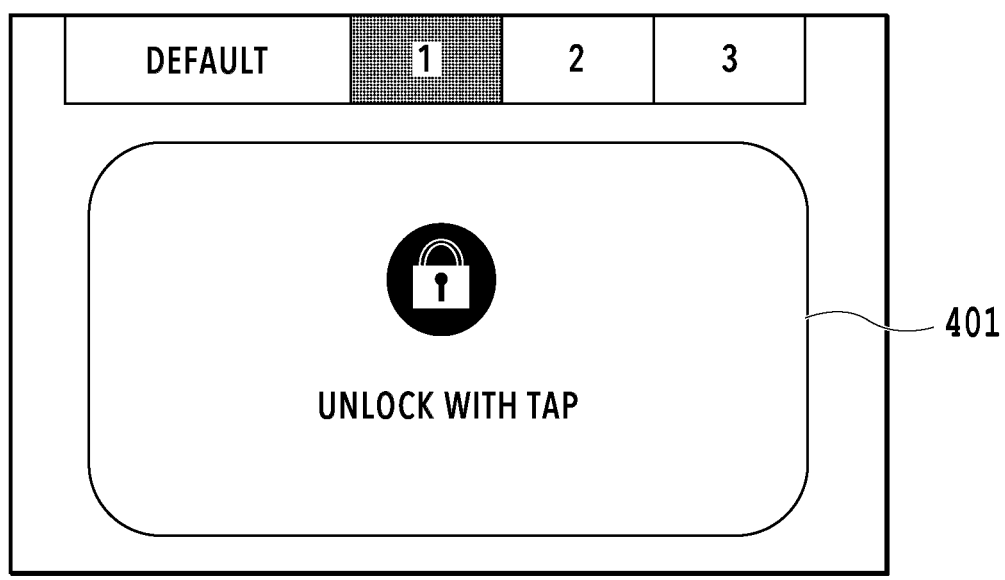
FIG. 4 is a diagram illustrating a locked screen of a custom home that is displayed on the operation display unit.

FIG. 4 is a diagram illustrating a locked screen of the tab 202 that is displayed on the operation display unit 108. In a case where the user selects the tab 202, which is a tab corresponding to the locked custom home screen, the custom home screen is not displayed but the screen illustrated in FIG. 4 is displayed. With the user pressing an unlock button 401, the password input screen is displayed, and if the inputted password matches the correct password, the custom home screen of the tab 202 is displayed. Note that, the correct password is set for each tab. Note that, in the present embodiment, although the custom home screen is displayed by the unlocking using password authentication, another authentication method may be applicable. For example, the custom home screen may be displayed by the unlocking using biometric authentication. Additionally, in the present embodiment, a locked state is a state in which a user operation on the menu screen corresponding to the selected tab is limited. For example, it is a state in which the menu screen corresponding to the selected tab is not displayed as illustrated in FIG. 4. Alternatively, it may be a state in which the menu screen corresponding to the selected tab is displayed but the user cannot change the contents displayed on the menu screen.

In the present embodiment, in a case where a menu of another tab is displayed from the custom home screen of the tab 202 currently displayed, and thereafter the tab 202 is pressed again, the locked screen is not displayed, and the custom home screen of the tab 202 is displayed without the password input by the user.

Figure 5:
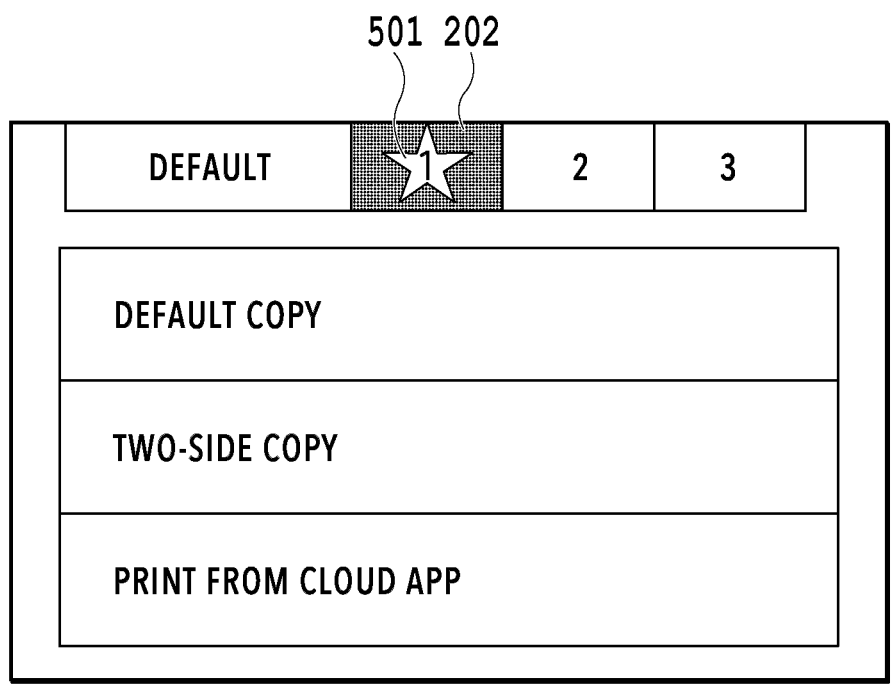
FIG. 5 is a diagram illustrating the custom home screen after being unlocked that is displayed on the operation display unit.

FIG. 5 is the unlocked custom home screen displayed on the operation display unit 108. An unlocked state icon 501 indicates that the lock setting of the currently displayed custom home screen corresponding to the tab 202 is unlocked. Note that, an icon that indicates that the lock setting is unlocked is not limited to 501 in FIG. 5. For example, an icon that indicates that it is unlocked like 812 in FIG. 8 may be applicable.

In the present embodiment, the user can lock the tab by pressing the unlocked state icon (that is, the tab 202 in FIG. 5). Note that, the unlocked state icon 501 is not displayed on a tab in which the lock setting is ineffective, and no processing is performed even in a case where the tab of the custom home screen currently displayed is pressed. Note that, the setting of whether to make the lock setting of the tab effective or ineffective is performed in advance for each tab. The setting of whether to make the lock setting of the tab effective or ineffective may be performed from the setting button 210, for example.

<Flowchart>

Figure 6:
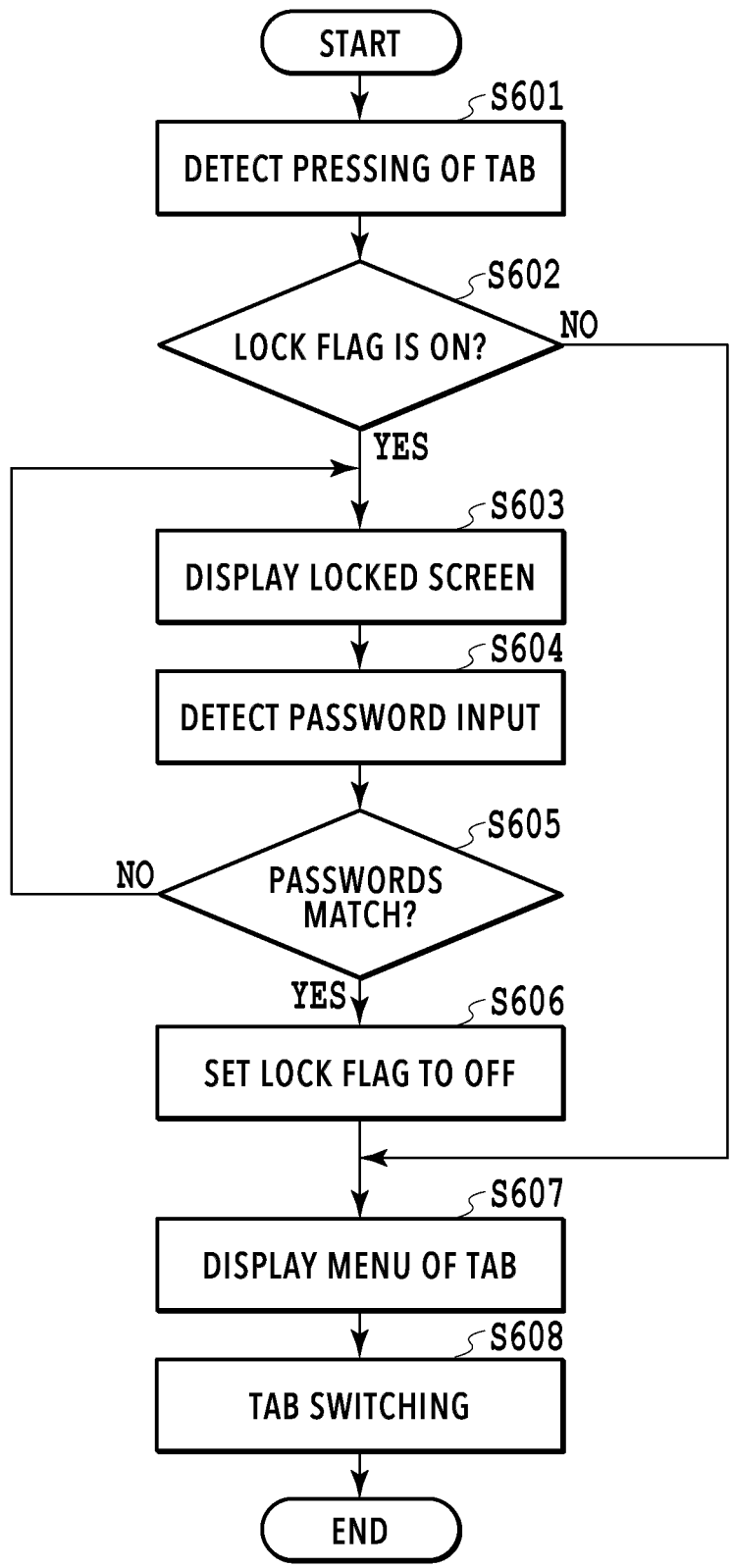
FIG. 6 is a flowchart illustrating an unlocking sequence of the custom home screen.

FIG. 6 is a flowchart describing an unlocking sequence of the present embodiment. A flow of the processing by the user to unlock the tab is described with reference to FIG. 6. A series of the processing illustrated in the present flowchart is performed with the CPU 101 of the MFP 100 deploying a program code stored in the ROM 102 to the RAM 103 to execute. Note that, "S" in each description of the processing below means that it is a step in the flowchart, and the same applies to the subsequent embodiments. The present processing is executed in a case where the user presses the tab of the custom home screen. Additionally, the present processing is started with the screen operation unit 108 detecting a predetermined operation such as touching.

First, in S601, the CPU 101 detects the tab that is pressed by the user. In S602, the CPU 101 determines whether a lock flag of the tab is ON. The lock flag of the tab is individually prepared for each tab and is set to ON in a locking operation of the tab. Details related to the locking operation of the tab are described later. If the lock flag is OFF, in S607, the CPU 101 displays the menu of the tab. Note that, the lock flag of the tab in which the lock setting is ineffective is constantly OFF. As mentioned above, the setting of whether to make the lock setting of the tab effective or ineffective is set in advance for each tab.

If the lock flag is ON, in S603, the CPU 101 displays the locked screen as illustrated in FIG. 4. In S604, once the CPU 101 detects the password input from the user, in S605, whether the passwords match is determined. If the passwords do not match, the locked screen is displayed again in S603. If the passwords match, in S606, the lock flag is set to OFF, and thereafter, in S607, the menu of the tab is displayed.

In S608, in a case where the switching to another tab is performed by the user operation, the CPU 101 maintains the state of the lock flag of the previous tab before the switching, in which the lock flag is set to OFF in S606, to OFF. Thus, in a case where it is detected in S601 that the tab is pressed again, it is determined in S602 that the lock flag is OFF, and the user can display the menu of the tab without inputting the password. This is the flow of the processing to unlock the tab.

Next, processing by the user to lock the tab is described.

Figure 7:
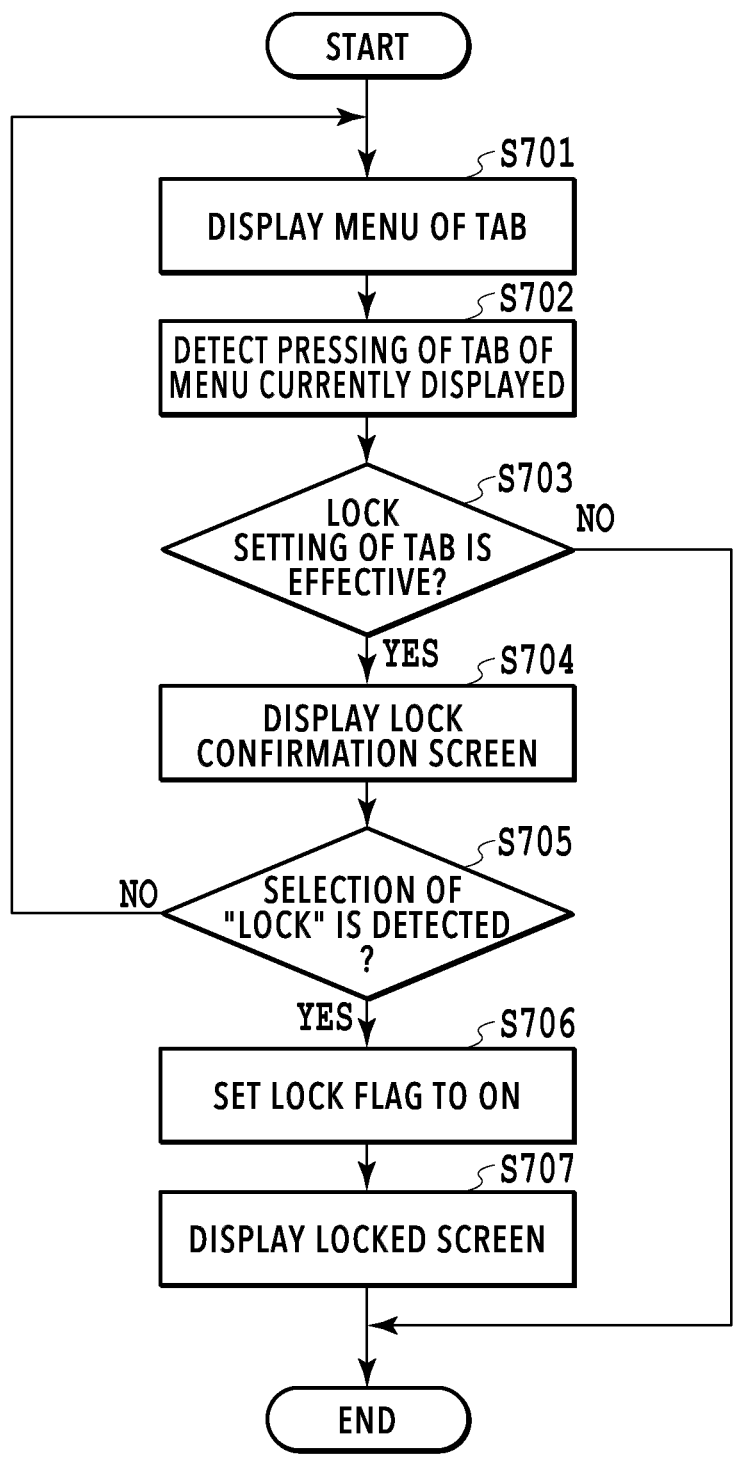
FIG. 7 is a flowchart illustrating a locking sequence of the custom home screen by a tab operation.

FIG. 7 is a flowchart describing a processing sequence in a case where the user locks the tab. A series of the processing illustrated in the present flowchart is performed with the CPU 101 of the MFP 100 deploying a program code stored in the ROM 102 to the RAM 103 to execute. The present processing is started with the tab being set to the unlocked state by an unlocking operation by the user such as password authentication.

In S701, the CPU 101 displays the menu of the tab on the operation display unit 108. In S702, the CPU 101 determines whether the pressing of the tab of the menu currently displayed on the operation display unit 108 is detected. In the present step, for example, if it is determined that no pressing of the tab is detected until a period of time determined in advance passes, the CPU 101 ends the present processing. On the other hand, if it is determined that the pressing of the tab is detected until the period of time determined in advance passes, in S703, whether the lock setting of the tab is effective is determined. As mentioned above, the setting of whether to make the lock setting of the tab effective or ineffective is performed in advance for each tab. If the lock setting of the tab is ineffective, the processing ends. If the lock setting of the tab is effective, in S704, a lock confirmation screen is displayed. The lock confirmation screen is a display screen 850 in FIG. 8, for example. Meanwhile, the user selects whether to lock the tab on the lock confirmation screen. If it is detected that do not lock is selected by the user operation on the lock confirmation screen, the CPU 101 causes the processing to return to S701.

If it is detected in S705 that to lock is selected, in S706, the CPU 101 sets the lock flag to ON, and after the locked screen is displayed in S707, the processing ends. This is the flow of the processing in a case where the tab is locked by the user.

Next, a series of flows of locking and unlocking the tab in FIGS. 6 and 7 described above is described by using the screen displayed on the operation display unit 108.

Figure 8:
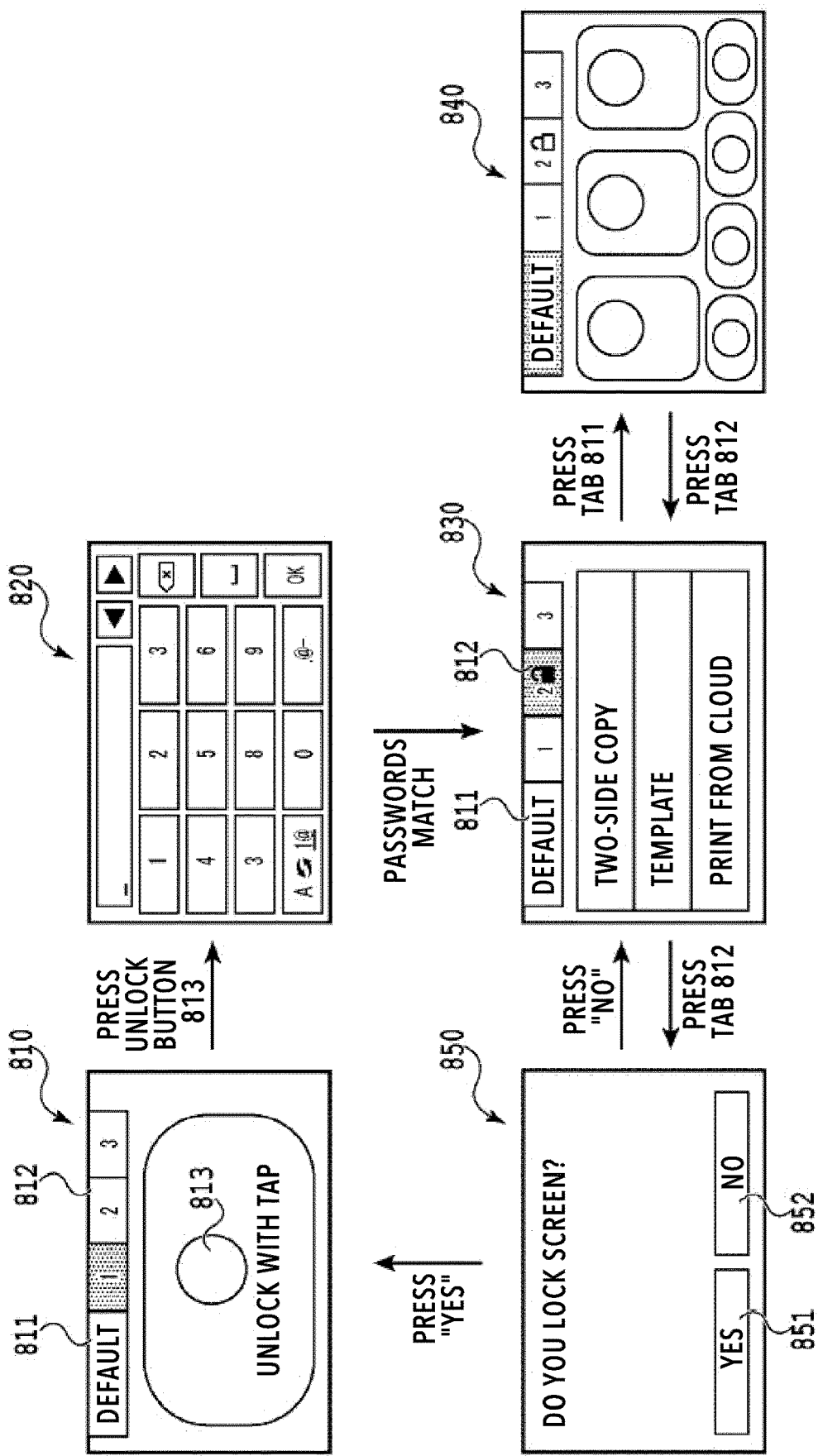
FIG. 8 is a diagram describing a screen transition of a display screen.

FIG. 8 is a diagram describing a transition of a display screen in a case where the tab is locked and unlocked. First, a display screen 810 is a display screen in a case where the user presses a tab 812 in which the lock flag is ON. This is a display screen corresponding to S601 to S603 in the flowchart in FIG. 6. In a case where the user presses an unlock button 813 on the display screen 810, a display screen 820 that is a password input screen is displayed. In a case where the user inputs the correct password, a display screen 830 is displayed. This display screen 830 is a display screen corresponding to the tab 812 and is a screen corresponding to S607 in FIG. 6. Additionally, on the display screen 830, a mark indicating that it is the unlocked state is displayed on the tab 812.

In a case where the user presses a tab 811, which is a default tab, on the display screen 830 of this tab 812, a display screen 840 is displayed. In this process, the tab 812 in the unlocked state maintains the unlocked state with no change. In a case where the operation on the display screen 840 ends, and the user presses the tab 812 again, the display screen 830 is displayed without performing the unlocking operation. In this case, in a case where the user presses the tab 812 on which the mark indicating that it is the unlocked state is displayed, the display screen 850 is displayed. That is, in the present embodiment, the tab becomes a re-lock button while the menu of the tab is displayed. Note that, the above descriptions (that is, a screen transition from the display screen 830 to the display screen 850) are a screen transition corresponding to S702 to S704 in FIG. 7. The display screen 850 is a display screen to select whether to lock the screen, and in a case where the user presses a yes button 851, the concerned tab 812 is switched into the locked state. In a case where a no button 852 is pressed, the display screen 830 is displayed. This is a description of a case where the tab is locked and unlocked by using the display screen displayed on the operation display unit 108.

Next, a method of setting all the tabs in which the lock setting is effective to the locked state in a case where the backlight of the operation display unit 108 is off is described. The backlight of the operation display unit 108 is turned on in a case where the user operates the operation display unit 108 and is turned off to reduce the power consumption in a case where the operation by the user is not detected for a certain period of time in the on state.

Figure 9:
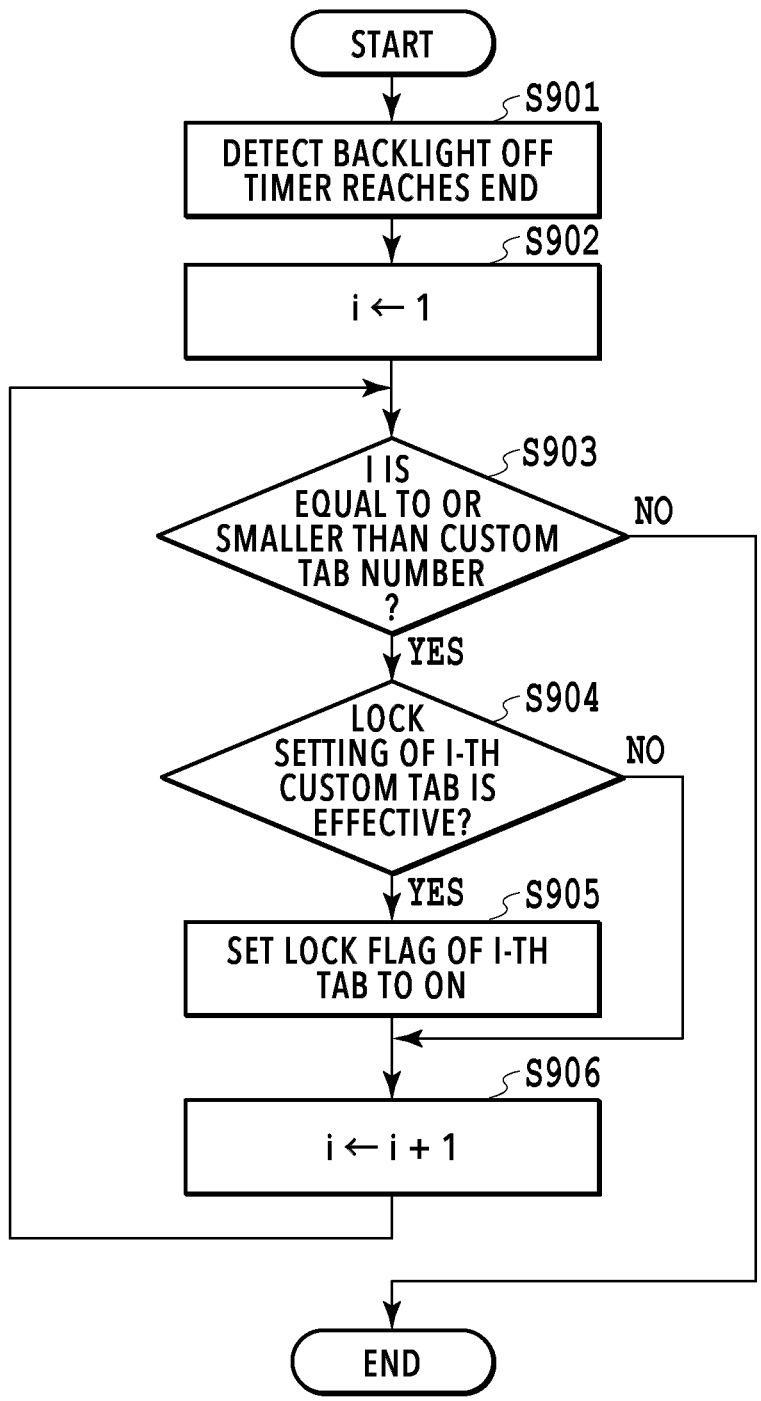
FIG. 9 is a flowchart illustrating a custom home screen locking sequence in a case where a backlight is turned off.

FIG. 9 is a flowchart describing a locking processing sequence in a case where the backlight is off. A series of the processing illustrated in the present flowchart is performed with the CPU 101 of the MFP 100 deploying a program code stored in the ROM 102 to the RAM 103 to execute.

In S901, once the CPU 101 detects that a backlight off timer reaches the end, in S902, the CPU 101 initializes an index i to 1. In S903, the CPU 101 determines whether the index i is equal to or smaller than the custom tab number. If the index i is equal to or smaller than the custom tab number in S903, in S904, the CPU 101 determines whether the lock setting of the i-th custom tab is effective. If the lock setting of the i-th custom tab is effective, in S905, the CPU 101 sets the lock flag of the i-th custom tab to ON.

If the lock setting of the i-th custom tab is ineffective in S904, or after the lock flag of the i-th custom tab is set to ON in S905, in S906, the CPU 101 increments the index i by one. After S906 is executed, in S903, whether the index i is equal to or smaller than the custom tab number is determined again. If the index i is greater than the tab number in S903, the CPU 101 ends the present processing. Thus, it is possible to lock the tabs in the ascending order of the number of the tabs until the index i reaches the same value as the custom tab number. That is, it is possible to set all the tabs with the effective lock setting to the locked state at the timing at which the backlight is turned off. With this processing, even in a case where the user after finishing with the operation forgets an operation such as logging out, it is possible to lock the tab that should be in the locked state after a certain period of time passes.

As described above, according to the present embodiment, it is possible to improve the operability of the display screen. Specifically, in a case where a transition from the screen of the tab in the unlocked state that is currently displayed to the screen of another tab is made, the unlocked state of the tab before the transition is maintained. Thus, for example, in a case where an operation to go back and forth between multiple tabs is performed, it is possible to save the effort of performing the unlocking operation many times, and thus the operability is improved. Note that, although the display screen of the MFP 100 is described as an example in the present embodiment, it is not limited thereto, and the present embodiment may be applicable to any apparatus as long as the apparatus includes an operation display unit. Additionally, for example, the MFP 100 may cause another apparatus (a smartphone or a PC) communicated with the MFP 100 to display each screen described above to execute the setting of the MFP 100 and to cause the MFP 100 to execute various types of processing. Moreover, the present embodiment may be applicable to the screen displayed on the other apparatus.

Next, control to initialize editing contents of the custom home screen for each tab in the present embodiment is described. In a case where the user initializes all the editing contents of the custom home screen of a specific scene (tab), there is a high possibility that the tab is used by another user, or the tab is used for a different purpose even if the user is the same. Therefore, while the editing contents are cleared (initializing or resetting), cookie information used in the tab is also cleared (initialized, reset, or deleted), and thus it is possible to prevent a security problem such as to keep using the cookie information by mistake without additionally performing a cookie clearing operation.

In this case, the deleting of the cookie information is processing performed on all the tabs in general, and it is not expected that only the cookie information on a specific tab is deleted along with the initialization of the specific tab as described above. A method of deleting the cookie information on only the specific tab in a case where the specific scene (tab) is initialized is described below.

Figure 10:
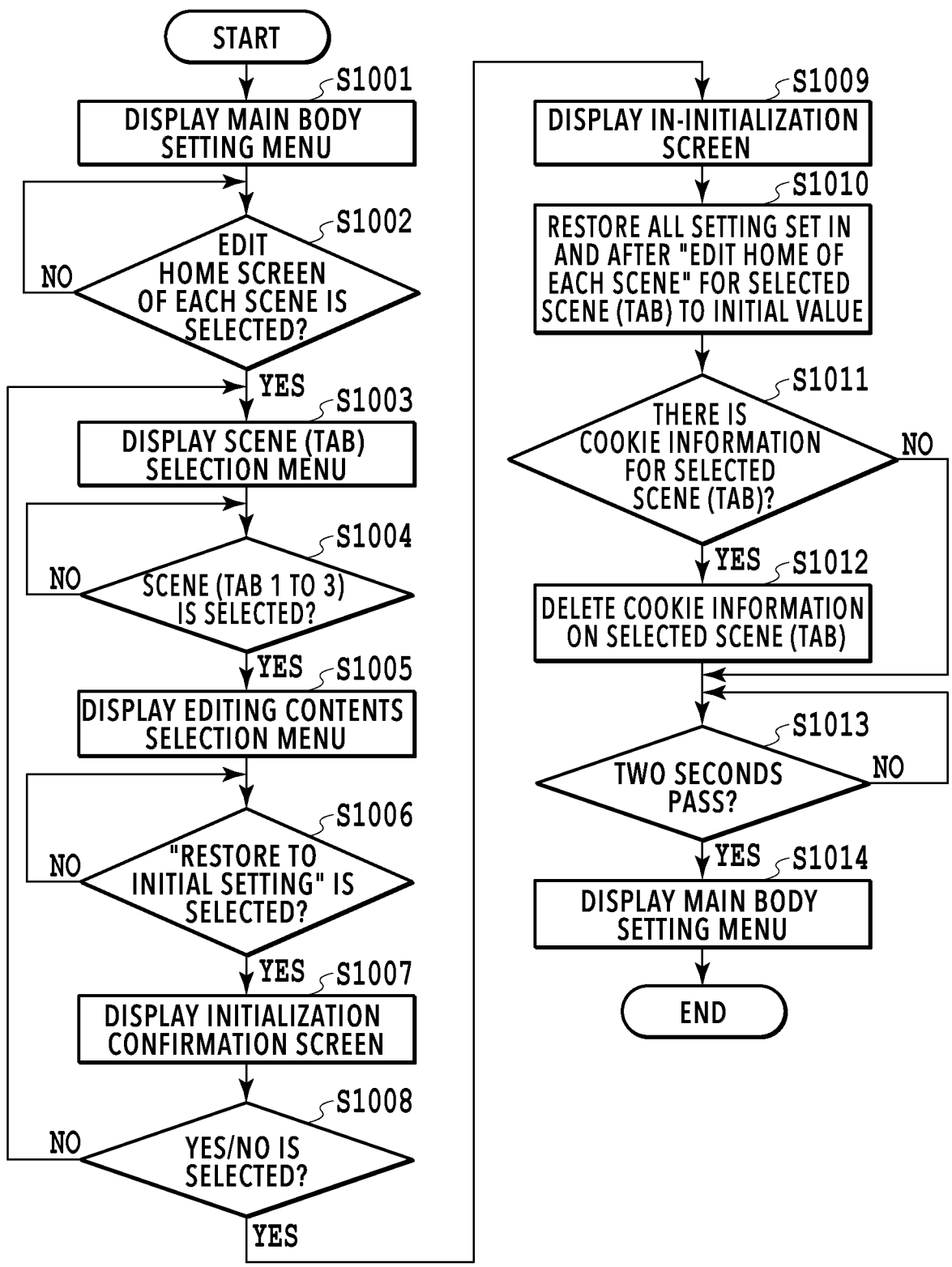
FIG. 10 is a flowchart illustrating an execution sequence in a case where the custom home screen is restored to initialization setting.

FIG. 10 is a flowchart illustrating an initialization sequence of the editing contents of the custom home screen. A series of processing illustrated in the present flowchart is performed with the CPU 101 of the MFP 100 deploying a program code stored in the ROM 102 to the RAM 103 to execute.

Figure 11:
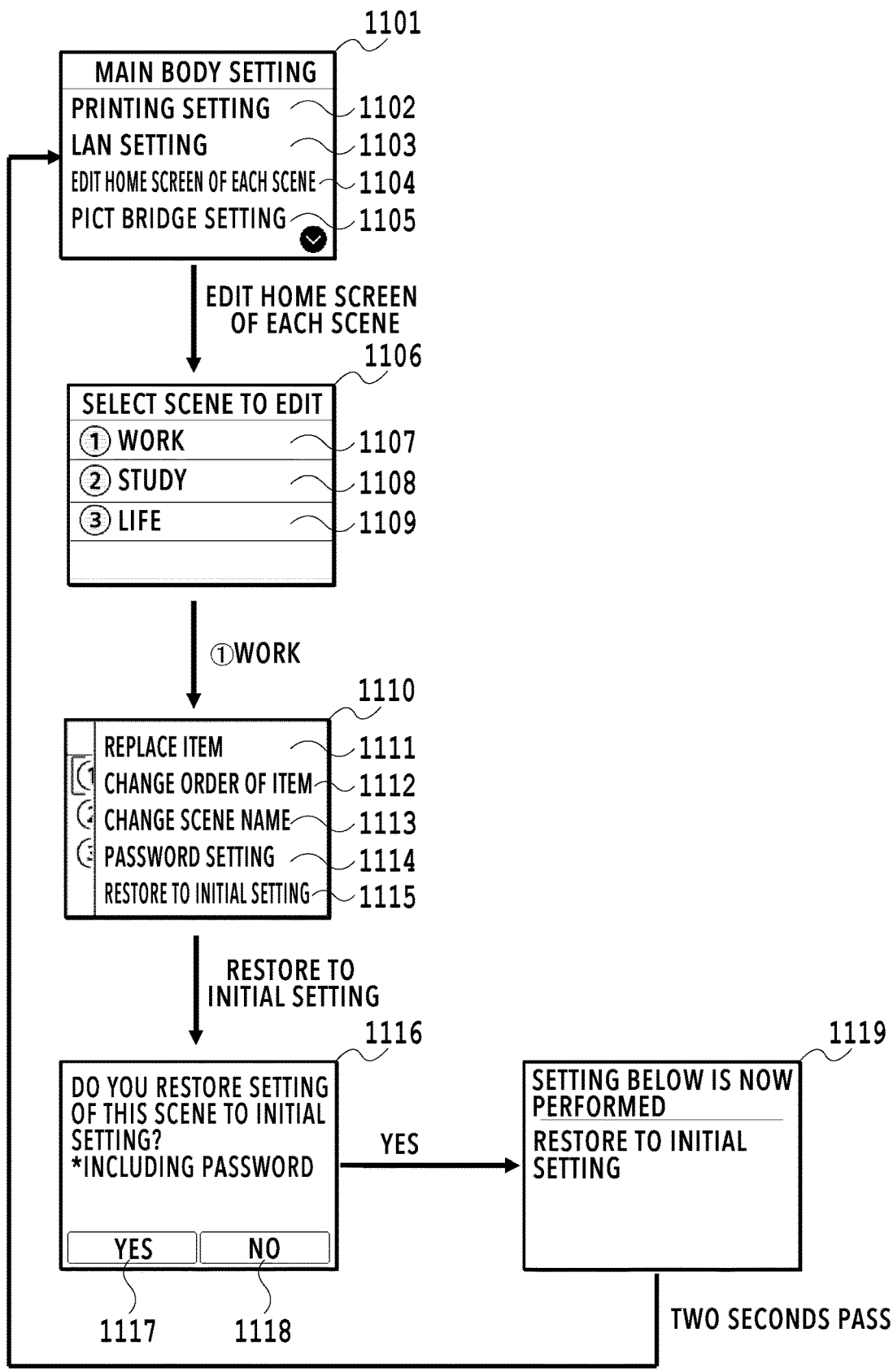
FIG. 11 is a diagram illustrating a screen in a case where the restoring of the custom home screen to the initialization setting is executed.

Additionally, FIG. 11 is a diagram illustrating a screen image displayed in an initialization operation on the editing contents of the custom home screen, and each screen is displayed according to the flowchart illustrated in FIG. 10. An initialization flow of the editing contents of the custom home screen according to the flowchart in FIG. 10 is described below with reference to the screen image (FIG. 11) corresponding to each flow.

In S1001, the CPU 101 displays a main body setting menu. A display 1101 in FIG. 11 indicates a screen image of the main body setting menu, 1102 indicates an option to execute "printing setting", 1103 indicates an option to execute "LAN setting", 1104 indicates an option to execute "edit home screen of each scene", and 1105 indicates an option to execute "Pict Bridge setting". In S1002, if the CPU 101 detects that "edit home screen of each scene" is selected, in S1003, a scene (tab) selection menu is displayed.

A display 1106 in FIG. 11 illustrates a screen image of a scene selection menu. An option 1107 indicates "work" as a first scene (tab), an option 1108 indicates "study" as a second scene (tab), and an option 1109 indicates "life" as a third scene (tab), respectively. In this case, in S1004, if the CPU 101 detects that the user selects any one of the scenes, in S1005, the CPU 101 displays an editing contents selection menu.

A display 1110 in FIG. 11 illustrates a screen image of the editing contents selection menu in a case where "work" is selected on the display 1106. An option 1111 is "replace item" to edit an item displayed on each custom home screen, an option 1112 is "change order of item" to edit the order of the item, and an option 1113 is "change scene name" to edit a scene name. Additionally, an option 1114 is "password setting" to edit the password for the password lock of each scene (tab), and an option 1115 is "restore to initial setting" to restore all the editing contents to the initial state in the arrival.

In S1006, once the CPU 101 detects that "restore to initial setting" as the option 1115 is selected, in S1007, an initialization confirmation screen is displayed.

A display 1116 in FIG. 11 illustrates a screen image of the confirmation screen displayed by selecting "restore to initial setting", and a button 1117 indicates "yes", while a button 1118 indicates "no".

In S1008, the CPU 101 branches the processing depending on the selection by the user on the display 1116. If it is detected that the user selects "yes", the processing transitions to S1009, and an in-initialization screen is displayed. If it is detected that "no" is selected, the processing returns to the displaying of the scene selection menu in S1003.

A display 1119 in FIG. 11 illustrates a screen image of the in-initialization screen and indicates to the user that the initialization processing is being performed.

In S1010, the CPU 101 restores all the editing contents of the home screens that are edited based on each editing item shown in the display 1110 in FIG. 11 for the selected scene (tab) to an initial setting value in the arrival. In S1011, the CPU 101 determines whether there is the cookie information for the scene (tab) selected by the user and branches the processing whether there is the cookie information. If there is no cookie information for the scene (tab) selected by the user, the processing transitions to S1013. On the other hand, if there is the cookie information, the CPU 101 allows the processing to transition to S1012, and after the cookie information is completely deleted, the processing transitions to S1013.

In S1013, the CPU 101 displays the in-initialization screen for two seconds. In S1014, the CPU 101 displays the main body setting menu again. Thereafter, the present processing ends.

This is the processing to initialize the editing contents of the custom home screen of each tab. In the present embodiment, an example in which the cookie information held in the designated tab is cleared is described; however, it is not limited thereto, and there may be a case where relevant information other than "menu editing contents" individually held in the designated tab is cleared. For example, setting information on a sheet is held in each tab, and control to clear the sheet setting information while the menu editing contents are cleared may be applicable. In this case, it is possible to make sure to initialize the sheet setting dedicated for each scene at a timing of clearing the menu editing contents.

Additionally, address information on destination of data scanned by an apparatus with an image scanning function or telephone book information of an apparatus with a faxing function may be individually held in each tab, and control to clear those information at the timing of clearing the menu editing contents may be applicable.

Moreover, the MFP 100 may hold the cookie information, the sheet setting information, the address information, and the telephone book information in each tab as the relevant information and may delete all the four types of information at the timing of clearing the menu editing contents. Alternatively, the MFP 100 may hold the cookie information, the sheet setting information, the address information, and the telephone book information in each tab as the relevant information and may delete only one of the four types of information at the timing of clearing the menu editing contents. In the present embodiment, the processing to delete one or more types of the relevant information is expressed as deleting at least one of the relevant information.

Next, processing in a case where a power-off operation is performed in an apparatus in a power-on state in the present embodiment is described.

Figure 12:
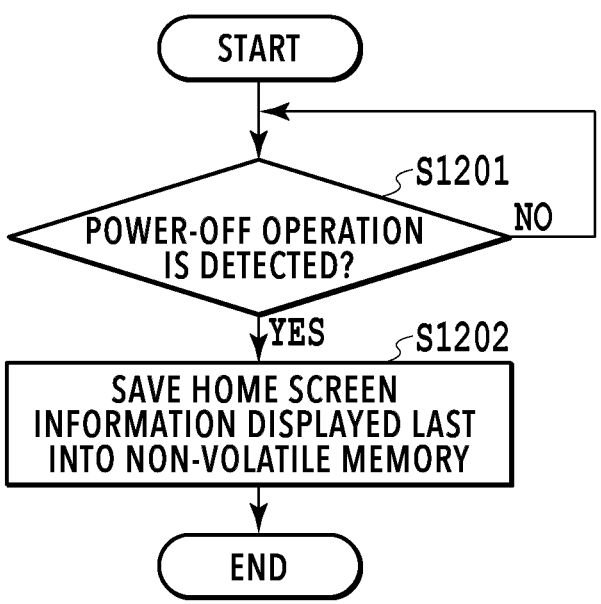
FIG. 12 is a flowchart illustrating a sequence in a case of being powered off.

FIG. 12 is a flowchart illustrating a sequence in a case where the MFP 100 is powered off. A series of processing illustrated in the present flowchart is performed with the CPU 101 of the MFP 100 deploying a program code stored in the ROM 102 to the RAM 103 to execute.

In S1201, the CPU 101 determines whether a power-off operation on the operation display unit 108 is detected. If the power-off operation is detected, the processing transitions to S1202. In S1202, the CPU 101 saves information indicating which of the scenes (tabs) out of the custom home screen and the default home screen is displayed last to the non-volatile memory 118. Thereafter, the processing flow ends.

Next, in the present embodiment, control in a case where a power-on operation is performed from the power-off state of the MFP 100 is described.

Figure 13:
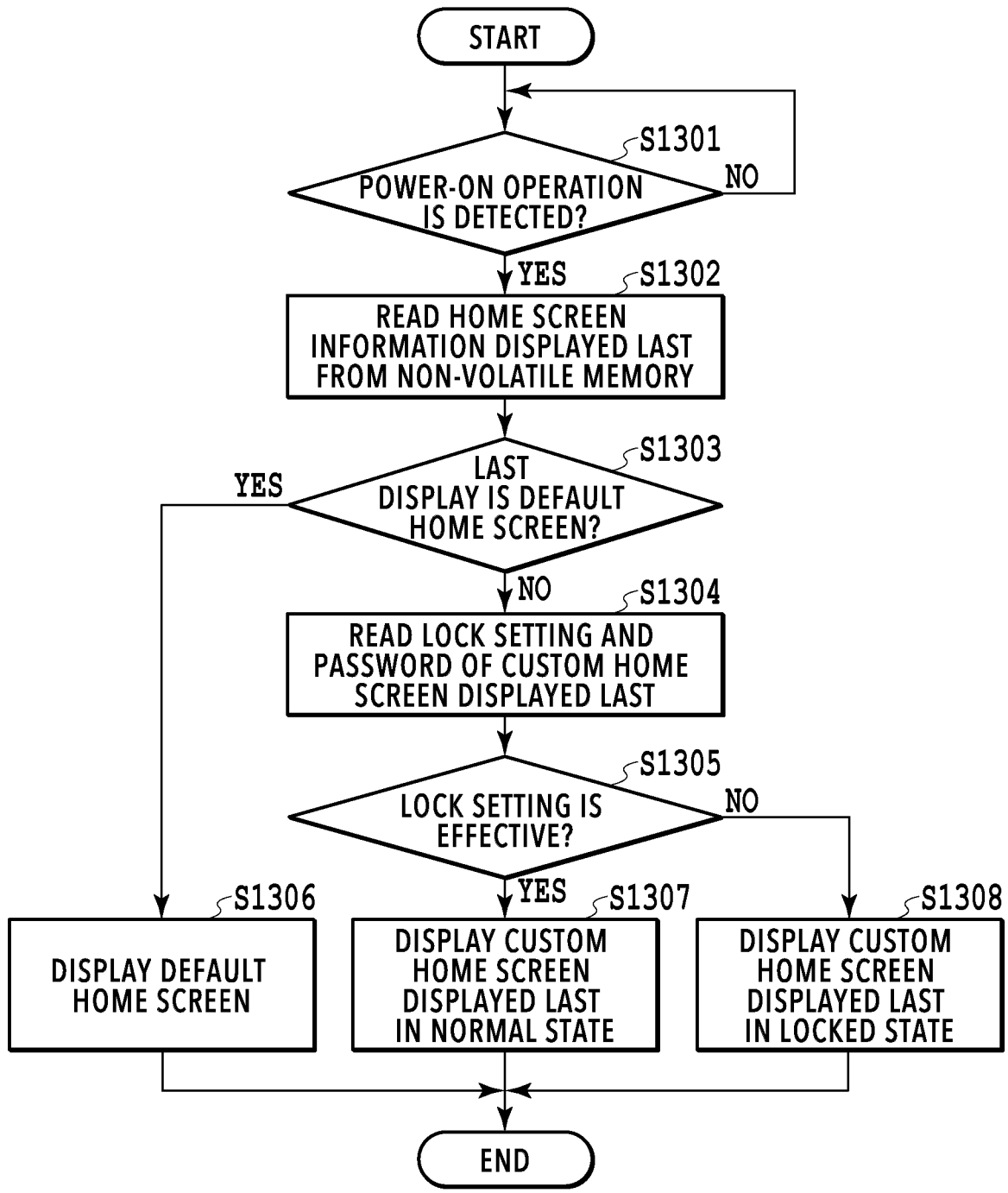

FIG. 13 is a diagram illustrating a control flow to power on. A series of processing illustrated in the present flowchart is performed with the CPU 101 of the MFP 100 deploying a program code stored in the ROM 102 to the RAM 103 to execute.

In S1301, the CPU 101 determines whether the power-on operation of the MFP 100 is detected. If the power-on operation of the MFP 100 is detected, the processing transitions to S1302, and the information on the tab displayed last that is saved in the non-volatile memory 118 in S1202 in FIG. 12 is read to the non-volatile memory 118.

In S1303, based on the information on the tab read in S1302, the CPU 101 determines whether the home screen displayed last is the default home screen. If the home screen displayed last is the default home screen, the processing transitions to S1306, and the CPU 101 displays the default home screen illustrated in FIG. 2. Thereafter, the present processing ends.

On the other hand, if the last home screen is not the default home screen (that is, if it is the custom home screen), the processing transitions to S1304, and the CPU 101 reads the lock setting and the password of the scene (tab) from the non-volatile memory 118.

In S1305, the CPU 101 confirms whether the lock setting read from the non-volatile memory 118 is ineffective. If it is confirmed that the lock setting is effective, the processing transitions to S1308, and the CPU 101 displays the custom home screen in the locked state as illustrated in FIG. 4. Thereafter, the present processing ends.

On the other hand, if it is confirmed that the lock setting is ineffective, the processing transitions to S1307, and the CPU 101 displays the custom home screen displayed last in a normal state (the unlocked state) as illustrated in FIG. 3. Thereafter, the present processing ends.

As above, with the above-described control, it is possible to automatically restore at the power-on timing the home screen displayed last before being powered off and to improve the operability by reducing the number of times of operating the tab.

As above, according to the present embodiment, it is possible to improve the operability of the display screen and to provide an optimal method of initializing the information held in each tab. Specifically, in a case where the custom home screen displayed in selecting a specific tab is initialized, not all the pieces of cookie information but the cookie information in the specific tab is deleted. Thus, comparing with a case where the pieces of cookie information in all the tabs are deleted, it is possible to maintain the operability since it is possible to hold the cookie information in another tab while securing the security by deleting the cookie information used in the initialized tab.

Other Embodiments

The present disclosure can also be implemented by processing in which a program that implements one or more functions of the above-described embodiment is supplied to a system or an apparatus through a network or a storage medium, and one or more processors in a computer of the system or the apparatus read and execute the program. Additionally, the present disclosure can also be implemented by a circuit (for example, an ASIC) that implements one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-171627, filed Oct. 26, 2022, which is hereby incorporated by reference wherein in its entirety.

What is claimed is:

1. A control apparatus, comprising at least one memory and at least one processor and/or at least one circuit which function as:
    a display control unit that performs control to display any one of a plurality of menu screens on which a plurality of menu items are arranged, respectively;
    a reception unit that receives an instruction to initialize the menu screen designated out of the plurality of menu screens;
    a control unit that performs control to initialize relevant information, which is information individually held correspondingly to the designated menu screen and includes cookie information used by a Web browser, based on the reception of the instruction of the initialization; and
    an editing unit that performs editing related to the designated menu screen based on an editing operation by a user on the designated menu screen out of the plurality of menu screens, wherein
    the control unit initializes contents of the designated menu screen edited by the editing unit to restore to a state before the editing and initializes the relevant information including the cookie information.

2. The control apparatus according to claim 1, wherein the editing performed by the editing unit is at least one of to replace the menu items, to change the order of the menu items, to change a name of the menu screen, and to set a password of the menu screen.

3. The control apparatus according to claim 1, wherein the display control unit performs control to display a plurality of display elements corresponding to each of the plurality of menu screens and, in accordance with selection of any one of the plurality of display elements by a user, performs control to display the menu screen corresponding to the selected display element.

4. The control apparatus according to claim 3, wherein the plurality of display elements are a plurality of tabs.

5. The control apparatus according to claim 1, wherein the relevant information individually held correspondingly to the designated menu screen includes setting information on a sheet for the apparatus.

6. The control apparatus according to claim 1, wherein the relevant information individually held correspondingly to the designated menu screen includes information identifying an external apparatus communicating image data.

7. The control apparatus according to claim 1 further comprising at least one memory and at least one processor and/or at least one circuit which function as:
    a lock unit that performs control such that at least one of the plurality of menu screens is in a locked state, wherein the lock unit performs control to set the locked state based on lock setting individually set for each menu screen in advance.

8. The control apparatus according to claim 7, wherein the lock setting is set to be whether effective or ineffective depending on the menu screen, and the lock unit can control the menu screen in which the setting is effective to be in the locked state.

9. The control apparatus according to claim 8 further comprising at least one memory and at least one processor and/or at least one circuit which function as:
a recording unit that records information identifying the menu screen displayed last out of the plurality of menu screens into a non-volatile memory, wherein
the display control unit displays the menu screen that is displayed last and recorded in the non-volatile memory on the display unit after the control apparatus is powered on.

10. The control apparatus according to claim 1 further comprising:
a printer that prints an image on a sheet.

11. A non-transitory computer readable storage medium storing a program which functions in a control apparatus and causes the control apparatus to function as:
a display control unit that performs control to display any one of a plurality of menu screens on which a plurality of menu items are arranged, respectively;
a reception unit that receives an instruction to initialize the menu screen designated out of the plurality of menu screens;
a control unit that performs control to initialize relevant information, which is information individually held correspondingly to the designated menu screen and includes cookie information used by a Web browser, based on the reception of the instruction of the initialization; and
an editing unit that performs editing related to the designated menu screen based on an editing operation by a user on the designated menu screen out of the plurality of menu screens, wherein
the control unit initializes contents of the designated menu screen edited by the editing unit to restore to a state before the editing and initializes the relevant information including the cookie information.

12. A method of controlling a control apparatus comprising:
performing control to display any one of a plurality of menu screens on which a plurality of menu items are arranged, respectively;
receiving an instruction to initialize the menu screen designated out of the plurality of menu screens;
performing control to initialize relevant information, which is information individually held correspondingly to the designated menu screen and includes cookie information used by a Web browser, based on the reception of the instruction of the initialization; and
performing editing to edit to the designated menu screen based on an editing operation by a user on the designated menu screen out of the plurality of menu screens, wherein
in said performing control to initialize relevant information, contents of the designated menu screen edited by said editing are initialized to restore to a state before the editing and the relevant information including the cookie information is initialized.

13. A control apparatus, comprising at least one memory and at least one processor and/or at least one circuit which function as:
a display control unit that performs control to display any one of a plurality of menu screens on which a plurality of menu items are arranged, respectively;
a reception unit that receives an instruction to initialize the menu screen designated out of the plurality of menu screens;
a control unit that performs control to initialize relevant information, which is information individually held correspondingly to the designated menu screen and includes cookie information used by a Web browser, based on the reception of the instruction of the initialization; and
a lock unit that performs control such that at least one of the plurality of menu screens is in a locked state, wherein
the lock unit performs control to set the locked state based on lock setting individually set for each menu screen in advance.

14. The control apparatus according to claim 13, wherein the lock setting is set to be whether effective or ineffective depending on the menu screen, and the lock unit can control the menu screen in which the setting is effective to be in the locked state.

15. The control apparatus according to claim 14 further comprising at least one memory and at least one processor and/or at least one circuit which function as:
a recording unit that records information identifying the menu screen displayed last out of the plurality of menu screens into a non-volatile memory, wherein
the display control unit displays the menu screen that is displayed last and recorded in the non-volatile memory on the display unit after the control apparatus is powered on.

16. The control apparatus according to claim 13 further comprising:
a printer that prints an image on a sheet.

17. A method of controlling a control apparatus comprising:
performing control to display any one of a plurality of menu screens on which a plurality of menu items are arranged, respectively;
receiving an instruction to initialize the menu screen designated out of the plurality of menu screens;
performing control to initialize relevant information, which is information individually held correspondingly to the designated menu screen and includes cookie information used by a Web browser, based on the reception of the instruction of the initialization; and
performing control such that at least one of the plurality of menu screens is in a locked state, wherein
in said performing control such that at least one of the plurality of menu screens is in a locked state, said at least one of the plurality of menu screens is set to the locked state based on lock setting individually set for each menu screen in advance.

* * * * *